(12) United States Patent
Seo

(10) Patent No.: US 7,760,952 B2
(45) Date of Patent: Jul. 20, 2010

(54) METHOD FOR SETTING MOTION VECTOR OF DIGITAL VIDEO

(75) Inventor: Kwang Deok Seo, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 1362 days.

(21) Appl. No.: 10/890,223

(22) Filed: Jul. 14, 2004

(65) Prior Publication Data

US 2005/0053138 A1    Mar. 10, 2005

(30) Foreign Application Priority Data

Sep. 9, 2003    (KR) .................... 10-2003-0063393

(51) Int. Cl.
G06K 9/36    (2006.01)
H04N 7/12    (2006.01)

(52) U.S. Cl. .................. 382/236; 382/232; 375/240.16

(58) Field of Classification Search ......... 382/232–233, 382/235–236; 375/240.14, 240
See application file for complete search history.

(56) References Cited

U.S. PATENT DOCUMENTS

| | | | |
|---|---|---|---|
| 4,307,420 A * | 12/1981 | Ninomiya et al. | 375/240.14 |
| 6,195,389 B1 * | 2/2001 | Rodriguez et al. | 375/240.16 |
| 6,591,014 B1 * | 7/2003 | Ueda | 382/236 |
| 7,260,148 B2 * | 8/2007 | Sohm | 375/240.16 |
| 2001/0021272 A1 * | 9/2001 | Yamori et al. | 382/236 |
| 2003/0072374 A1 * | 4/2003 | Sohm | 375/240.16 |

FOREIGN PATENT DOCUMENTS

| | | |
|---|---|---|
| EP | 1294194 | 3/2003 |
| JP | 09-070038 | 3/1997 |
| JP | 2000-350209 | 12/2000 |
| JP | 2002-344973 | 11/2002 |
| KR | 00152014 B1 | 6/1998 |
| KR | 000056813 A | 9/2000 |
| KR | 010083717 A | 9/2001 |
| KR | 100313870 B1 | 10/2001 |
| KR | 1020020044694 A | 6/2002 |
| KR | 1020030033479 A | 5/2003 |

OTHER PUBLICATIONS

Seo et al. "Fast Motion Vector Refinement for MPEG-1 to MPEG-4 Transcoding With Spatial Down-Sampling In DCT Domain" IEEE Published 2001, vol. 1, pp. 469-472.*

Shanableh et al. "Heterogeneous Video Transcoding To Lower Spatio-Temporal Resolutions And Different Encoding Formats" IEEE Transactions on Multimedia, vol. 2, No. 2, Published on Jun. 2000, pp. 101-110.*

Shanableh T. et al.: "Transcoding of video into different encoding fomats" Proceeding of ICASSP 2000, vol. 6, Jun. 5, 2000, pp. 1927-1930, paragraph 3-page 1929.

(Continued)

*Primary Examiner*—Duy M Dang
(74) *Attorney, Agent, or Firm*—KED & Associates LLP

(57) ABSTRACT

A method for setting a motion vector of a digital video including calculating a final motion vector allocated to a resolution-reduced macroblock using two motion vectors having a highest correlation among each other out of motion vectors of four adjacent macroblocks.

20 Claims, 4 Drawing Sheets

OTHER PUBLICATIONS

Wong J.W.C. et al.: "Predictive motion estimation for reduced-resolution video from high-resolution compressed video" Image Processing, 1998. ICIP 1998.

Sugano M. et al.: "An efficient transcoding from MPEG-2 to MPEG-1" Proceddings 2001 International Conference On Image Processing. ICIP 2001.

Japanese Office Action dated Sep. 15, 2006.

Bo Shen et al., "Adaptive Motion-Vector resampling for Compressed Video Downscaling," IEEE Transactions On Circuits And Systems For Video Technology, vol. 9, No. 6, Sep. 1999, pp. 929-936.

* cited by examiner

METHOD FOR SETTING MOTION VECTOR OF DIGITAL VIDEO

CROSS-REFERENCE TO A RELATED APPLICATION

This application is related to Korean Application No. 10-2003-0063393, filed on Sep. 9, 2003, the entire contents of which is hereby incorporated in its entirety.

BACKGROUND OF THE INVENTION

1. Field of the Invention

The present invention relates to a method for setting a motion vector of a digital video, and more particularly to a method for setting a motion vector of a digital video capable of converting a compressed digital video into a video with a low resolution.

2. Description of the Related Art

In digital video coding techniques (e.g., H.261, H.263, MPEG, etc.), a motion vector is estimated using a 16×16 luminance macroblock in which each macroblock has one motion vector.

For example, FIG. 1 illustrates a general principle of a reduction resolution process in which the width and length of the original image is downscaled in half. In this example, the resolution downscaling process is applied to each 8×8 block of a 16×16 macroblock, in which one 16×16 macroblock is downscaled to one 8×8 block.

For I-picture and P-picture elements of a digital video, the resolution is reduced as shown in FIG. 1. However, for the P-picture element, an additional process is necessary to choose a motion vector to reduce the resolution.

For example, FIG. 2 illustrates a resolution reducing technique for the P-picture element. As shown in FIG. 2, the resolution is reduced from four adjacent macroblocks (M1, M2, M3 and M4) of the P-picture element to one macroblock (N). Prior to the reduction resolution process, each macroblock (Mi) is coded in an inter coded mode and has a motion vector $mv_i$ and prediction error blocks $e_{ij}$ (i,j=1, 2, 3, 4).

In more detail, each of the four blocks $e_{11}$~$e_{14}$ of the macroblock (M1) is downscaled to one block ($e_1$). Likewise, each of the four blocks in $M_2$ is downscaled to one block ($e_2$), each of the four blocks in $M_3$ is downscaled to one block ($e_3$), etc. Then, after the reduction resolution process, an intermediate motion vector ($mv_i'$) allocated to each resolution-reduced prediction error block ($e_i$) is obtained using the below equation (1):

$$mv_i' = \frac{mv_i}{2} \quad (1)$$

where $mv_i$ is an input motion vector before the resolution process reduction and corresponds to when the width and length of the macroblock are reduced in half.

In a general video coding technique, the resolution-reduced macroblock (N) is expressed by one motion vector (mv) because one macroblock has one motion vector.

The following three methods are used to set the motion vector (mv). The first method was presented in an article "T. Shanableh and M. Ghanbari, Heterogeneous video transcoding to lower spatio-temporal resolutions and different encoding formats, IEEE Trans, Multimedia, Vol. 2, No. 2, pp. 101-110, June 2000." In this first method, a final motion vector is calculated by averaging the intermediate motion vectors for four input motion vectors using the following equation (2):

$$mv = \frac{mv_1' + mv_2' + mv_3' + mv_4'}{4} \quad (2)$$

A second motion vector setting method was proposed in the same article, in which the final motion vector is calculated using each intermediate value for four input motion vectors. First, the intermediate vectors ($mv_1'$, $mv_2'$, $mv_3'$, $mv_4'$) are defined, and then the distances between the intermediate vectors are calculated using the below Euclidean distance equation (3):

$$d_i = \sum_{j=1, j \neq i}^{4} \|mv_i' - mv_j'\| \quad (3)$$

As a final motion vector (mv), a motion vector positioned nearest to every vector by comparing Euclidean distances is set.

A third motion vector setting method is called an AMVR (Adaptive Motion Vector Resampling) method proposed in the article "B. Shen, I. Sethi, and V. Bhaskaran, adaptive motion vector resampling for compressed video down-scaling, IEEE Trans. Circuits Syst. Video Technol., Vol. 9, No. 6, pp. 929-936, September 1999." In this method, each activity is obtained through the number of DCT (Discrete Cosine Transform) coefficients (not '0'), for four input macroblocks and an average value of four motion vectors is obtained using the activity as a weight value for setting a final motion vector of a resolution-reduced macroblock.

However, the related art motion vector setting reducing resolution method does not accurately calculate the final motion vector of the resolution-reduced macroblock.

For example, FIG. 3 illustrates motion vectors of four adjacent macroblocks in a flat region. Even in a flat region where image characteristics do not change much, one motion vector obtained by a BMS (Block Matching Algorithm) can have a value much different from the other three motion vectors. Namely, there is a high probability that the final motion vector calculated according to the related art motion vector setting method (in which motion vectors are simply added and then divided by 4 to calculate a final motion vector or an average value is used as the final motion vector) would have a quite different value from the existing motion vector of FIG. 3. Thus, the picture quality of the finally resolution-reduced image is degraded.

The above-noted articles are all incorporated by reference in their entirety.

SUMMARY OF THE INVENTION

Accordingly, one object of the present invention is to address at least the above problems and/or disadvantages and to provide at least the advantages described hereinafter.

Another object of the present invention is to set a precise motion vector using two motion vectors having a highest correlation among each other out of four motion vectors when a compressed digital video is converted into an image with a low resolution.

Yet another object of the present invention is to enhance a processing rate by reducing a size of a refinement range required for refining a motion vector.

To achieve at least the above objects in whole or in parts, the present invention provides in one example a novel method for setting a motion vector of digital video for reducing a resolution of compressed and stored digital video. The method includes calculating a final motion vector allocated to a resolution-reduced macroblock using two motion vectors having a highest correlation among each other out of four motion vectors in adjacent macroblocks.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

BEST MODE OF THE INVENTION

A method for setting a motion vector of digital video according to the present invention will now be described with reference to the drawings.

As mentioned above, because the final motion vector is calculated using every adjacent motion vector, if even one motion vector is significantly different from the other motion vectors before the resolution reduction process is performed, the final motion vectors after the resolution reduction process have a quite different value from the motion vectors before the resolution reduction process. Thus, the picture quality of the resolution-reduced image is degraded.

In addition, when a precise motion vector is calculated using MVR (Motion Vector Refinement), the size of a refinement range is increased and the amount of calculation is accordingly increased in proportion to the size, causing the system load to be increased.

The present inventor determined there is a high probability that motion vectors of at least two macroblocks among motion vectors of four adjacent macroblocks have a high correlation in a region where an image does not change much. Accordingly, the present invention advantageously calculates a final motion vector using the two motion vectors with the highest correlation among each other.

Figure 1:
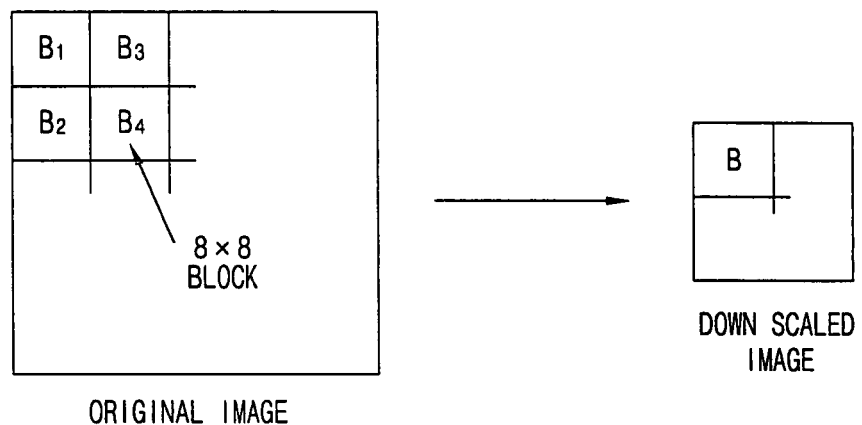
FIG. 1 illustrates a general block-unit resolution reduction technique.
Figure 2:
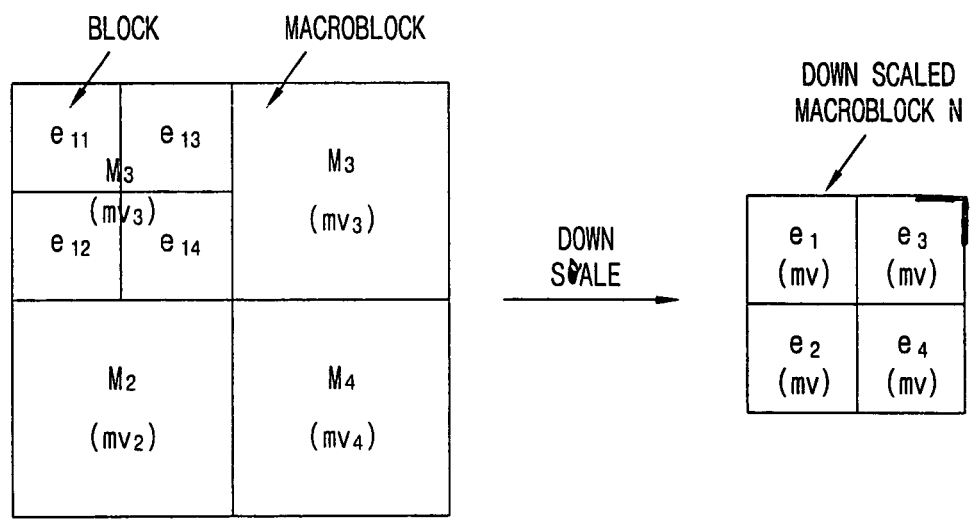
FIG. 2 illustrates a technique for reducing resolution of a P-picture in accordance with the related art.
Figure 3:
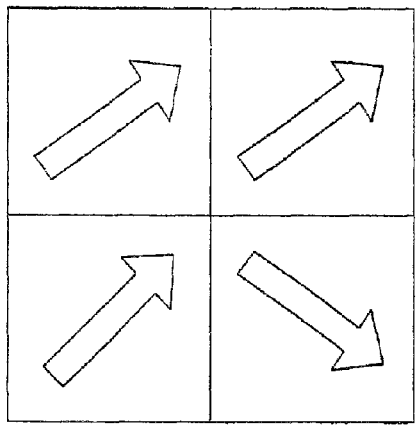
FIG. 3 illustrates motion vectors of four adjacent macroblocks in a flat region.
Figure 4:
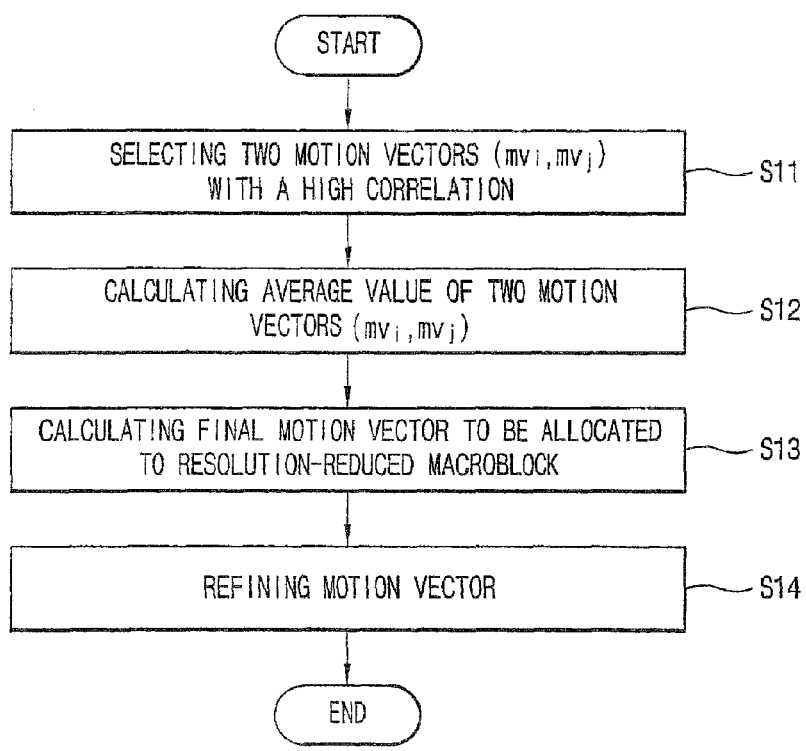
FIG. 4 is a flow chart of a method for setting a motion vector of digital video according to the present invention.

In more detail, FIG. 4 is a flow chart illustrating a method for setting a motion vector of digital video according to the present invention. First, two motion vectors with the highest correlation among each other are selected from four motion vectors (step S11). Namely, two motion vectors ($mv_i$, $mv_j$) with the highest correlation among each other are selected from motion vectors of four adjacent macroblocks using the below equation (4):

$$D(i, j) = \underset{i \ne j}{\arg\min}(|mx_i - mx_j| + |my_i - my_j|) \quad (4)$$

where $mx_i$, $my_i$ are values of horizontal and vertical components of an arbitrary motion vector $mv_i$ where (i,j=1, 2, 3, 4, ... i≠j). In Equation (4), the term "arg" is an abbreviation of the word "argument" and the term "min" is an abbreviation of the word "minimum," so that the function "arg min" operates to find the argument that obtains the minimum value. The argument i in this equation corresponds to a horizontal component of the motion vectors and the argument j corresponds to a vertical component of the motion vectors. The expression i≠j requires the function to be implemented for the motion vectors under conditions where the horizontal and vertical components are unequal.

The higher the correlation of the motion vectors substituted in equation (4), the lower the result will be. Thus, using equation (4) it is possible to find the two motion vectors with the highest correlation among each other.

After the two motion vectors ($mv_i$, $mv_j$) with the highest correlation among each other are selected from the four motion vectors, an average value (mv') of the motion vectors is obtained using the below equation (5) (step S12):

$$mv' = \frac{mv_i + mv_j}{2} \quad (5)$$

Then, the average value (mv') of the motion vectors is substituted into the below equation (6) to obtain a final motion vector (mv) corresponding to resolution-reduced macroblock (step S13):

$$mv = \frac{mv'}{2} \quad (6)$$

The final motion vector (mv) will have a similar value to the two motion vectors before the resolution reduction process, so that an accurate motion compensation is made for at least two macroblocks.

In addition, to enhance a picture quality of an image, the final motion vector can be refined according to a user's selection (step S14). Namely, the final motion vector allocated to the resolution-reduced macroblock can be made in a small region preset by a user.

Figure 5:
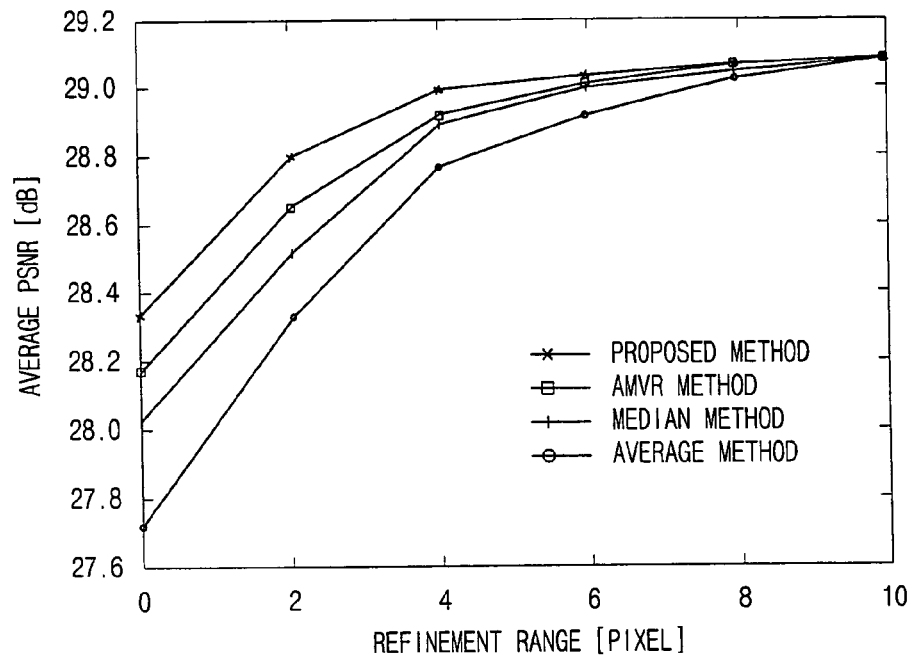
FIG. 5 is a graph showing a comparison between a performance of the motion vector setting method of the present invention and that of the related art.

Next, FIG. 5 is a graph showing a comparison between a performance of the motion vector setting method of the present invention and that of the related art.

With reference to FIG. 5, the resolution of 50 frames of an image of a 'football' of CCIR (International Radio Consultative Committee) 601 standards (704×480) coded by a 7 Mbps bit-rate MPEG-1 is reduced to an SIF (Source Input Format) (352×240).

In the graph, the longitudinal axis corresponds to an average PSNR (Peak Signal-to-Noise Ratio) and the lateral axis corresponds to a size of the motion vector refinement region.

As shown in FIG. 5, the present invention produces better picture qualities than the related art motion vector setting method.

Further, if the motion vector is not refined, the PSNR of the motion vector setting method of the present invention exhibits an improvement of a picture quality of about 0.6 dB compared to the related motion vector setting method using an average value. In this instance, the PSNR is a value indicating an objective evaluation of a picture quality of a restored image, and the higher the PSNR value, the higher the preservation rate of an original image.

Accordingly, by calculating the final motion vector using the present invention's motion vector setting method, the size of the refinement region required for refining the motion vector can be reduced. Thus, the amount of calculation required for the process of refinement can be reduced.

Figure 6:
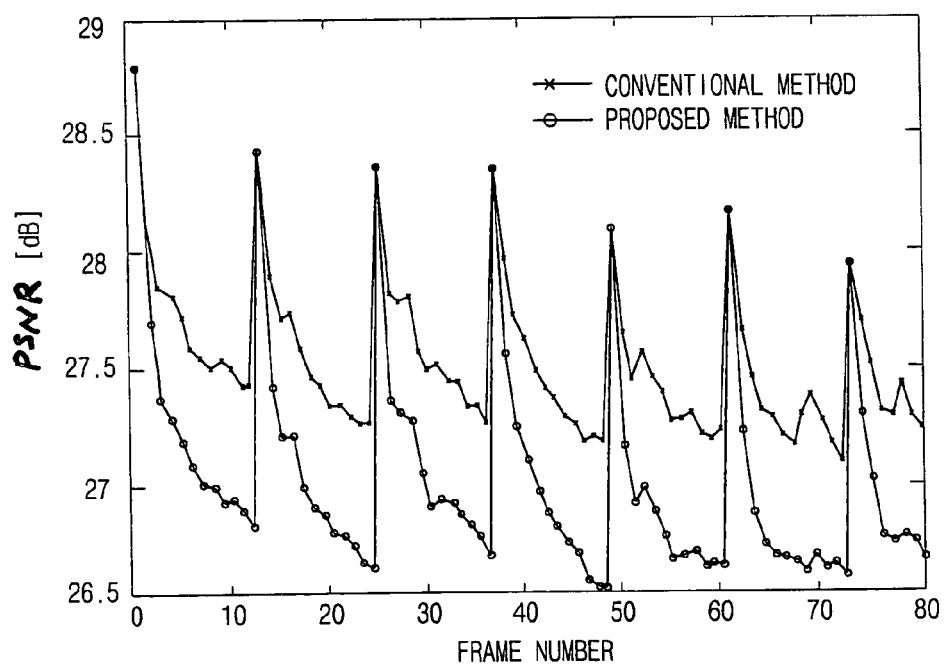
FIG. 6 is a graph showing a comparison between a picture quality by images of the motion vector setting method of the present invention and that of the related art.

Next, FIG. 6 is a graph illustrating a comparison of picture quality by the present invention and the related art. In FIG. 6, to objectively compare a picture quality of each image, the resolution of an image of a 'flower garden' coded in the 6.5 Mbps bit-rate MPEG-2 coded CCIR-601 standards was reduced to the SIF standards.

As shown in FIG. 6, the motion vector setting method in accordance with the present invention has a higher PSNR by about an average 0.3~0.7 dB than the related art motion vector setting method using the average value.

Figure 7:
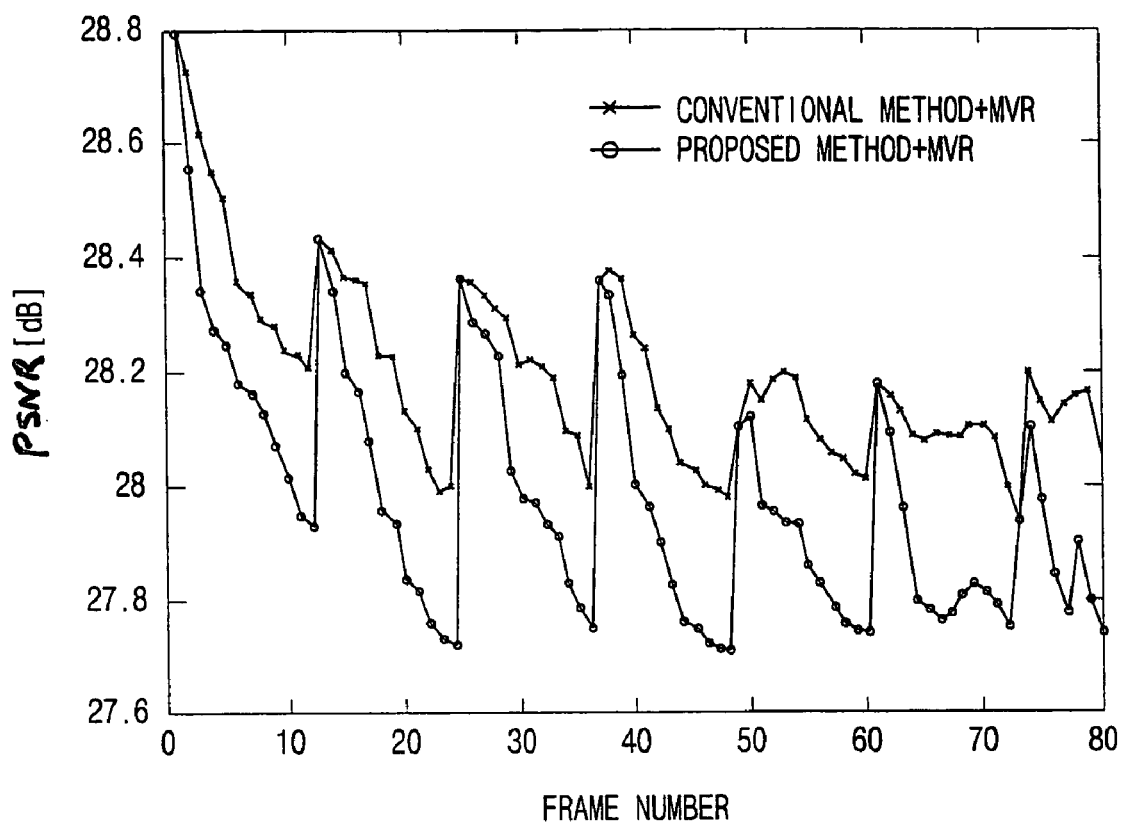
FIG. 7 is a graph showing application of a motion vector refinement to FIG. 6.

Next, FIG. 7 is a graph illustrating an application of a motion vector refinement to FIG. 6, in which the refinement region is [−2, +2] and an entire search method was applied in [−2, +2] for a reliable comparison between the present invention and the related art. As shown, the present invention provides a better image.

Further, comparison of the PSNRs of FIG. 7 with those of FIG. 6 shows that picture qualities of the method of the present invention and the related art method were enhanced. Further, the amount of difference of the PSNRs of the present invention and the related art method in FIG. 7 was reduced compared to the result as shown in FIG. 6.

The reason why the difference of the PSNR was reduced is because the inaccurate motion vector obtained according to the related art motion vector setting method is extracted as a motion vector close to an optimum motion vector according to refinement of the motion vector, and the extracted motion vector is close to the result value obtained by refining the motion vector obtained according to the present invention.

However, although the difference of the performance between the present invention and the related art motion vector setting method in FIG. 7 is reduced using refinement, as the refinement region is increased, the amount of required calculations increases in geometrical progression.

Therefore, as shown in FIG. 5, the motion vector setting method in accordance with the present invention may adopt a small refinement region compared to the related art method, to thereby reduce the amount of calculations and highly improve the performance.

In other words, in the present invention's method, when compressed and stored digital video is to be converted to an image with a lower resolution so as to be edited and transmitted, two motion vectors with the highest correlation among each are selected from motion vectors of four adjacent macroblocks to obtain a final motion vector to be allocated to a resolution-reduced macroblock. Thus, an accurate motion vector can be calculated compared to the related art method.

As so far described, the method for setting a motion vector of digital video in accordance with the present invention has at least the following advantages.

For example, first a motion vector of a resolution-reduced macroblock is obtained using two motion vectors with the highest correlation among motion vectors of four adjacent macroblocks, so that an optimum motion vector can be calculated to accurately compensate a motion for at least two macroblocks.

Second, a picture quality of a restored image of resolution-reduced digital video is enhanced by calculating an accurate motion vector to be allocated to the resolution-reduced macroblock.

Third, by reducing the size of the refinement region required for refining a motion vector, the amount of calculation is reduced, a refinement processing rate of the motion vector is improved, and a system load according to refinement of the motion vector is reduced.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for setting a motion vector of a digital video to be displayed on a display device, comprising:
   (a) identifying two motion vectors having a highest correlation between each other out of motion vectors of four adjacent macroblocks in a portion of the digital video, at least one of the motion vectors pointing in a substantially different direction from the motion vectors of one or more remaining ones of the four adjacent macroblocks;
   (b) calculating a first value based on an average of the two motion vectors having the highest correlation between each other;
   (c) calculating a final motion vector based on the first value;
   (d) reducing a resolution of the four adjacent macroblocks to form one or more smaller-sized macroblocks;
   (e) assigning the final motion vector to the one or more smaller-sized macroblocks; and
   (f) repeating (a)-(e) for 0 to N additional rectangular arrangements of four adjacent macroblocks in the digital video, where N is an integer equal to or greater than 1;
   forming a reduced-resolution version of the digital video based on (e) and (f); and storing or transmitting the reduced-resolution digital video for display on the display device, wherein (a)-(e) are preformed by a computer.

2. The method of claim 1, further comprising:
calculating the correlation among two motion vectors using the following equation:

$$D(i, j) = \underset{i \neq j}{\mathrm{argmin}}(|mx_i - mx_j| + |my_i - my_j|)$$

where i and j represent horizontal and vertical components of the motion vectors respectively and wherein the arg min function is applied under conditions where i,j=1, 2, 3, 4 where (i≠j), and $mx_i$, $my_i$ are values of horizontal and vertical components of the motion vectors.

3. The method of claim 2, wherein the lower a result of the equation, the higher the correlation is between the two motion vectors.

4. The method of claim 1, further comprising:
calculating a second value using the following equation:

$$mv = \frac{mv'}{2},$$

where mv' corresponds to an average value of the two motion vectors, and wherein the final motion vector is calculated based on the second value.

5. The method of claim 1, further comprising:
allocating the final motion vector to the one or more smaller-sized macroblocks in a predetermine region of the reduced-resolution digital video, wherein the predetermined region is preset by a user.

6. The method of claim 1, wherein the four adjacent macroblocks are provided in a rectangular arrangement within the digital video.

7. The method of claim 1, wherein the four adjacent macroblocks are included in a P frame in the digital video.

8. A method for setting a motion vector of a digital video having a plurality of macroblocks, comprising:
selecting two motion vectors that have a highest correlation between each other from motion vectors of four adjacent macroblocks, at least one of the motion vectors pointing in a substantially different direction from the motion vectors of one or more remaining ones of the four adjacent macroblocks;
calculating a final motion vector based on the two motion vectors;
reducing a resolution of the four adjacent macroblocks to form one or more smaller-sized macroblocks;
assigning the final motion vector to the one or more smaller-sized macroblocks; and
storing or transmitting a reduced-resolution version of the digital video for display on a display device based on the final motion vector assigned to the one or more smaller-sized macroblocks, wherein a computer is used to perform said selecting, calculating, reducing, assigning, and storing.

9. The method of claim 8, further comprising:
refining the final motion vector to be allocated to the resolution-reduced macroblock.

10. The method of claim 9, further comprising:
setting, by a user, a region of video to be refined.

11. The method of claim 8, wherein a resolution of the digital video is reduced in half.

12. The method of claim 8, wherein the correlation is calculated using the following equation:

$$D(i, j) = \underset{i \neq j}{\mathrm{argmin}}(|mx_i - mx_j| + |my_i - my_j|)$$

where i and j represent horizontal and vertical components of the motion vectors respectively and wherein the arg min function is applied under conditions where i,j=1, 2, 3, 4 where (i≠j), and $mx_i$, $my_i$ are values of horizontal and vertical components of the motion vectors $mv_i$.

13. The method of claim 12, wherein the lower a result of the equation, the higher the correlation is.

14. The method of claim 8, wherein calculating the final motion vector comprises:
obtaining an average value of the two motion vectors having the highest correlation among each other; and
obtaining the final motion vector to be allocated to the one or more smaller-sized macroblocks using the average value.

15. The method of claim 14, wherein obtaining the final motion vector is calculated by dividing the average value by 2.

16. A method for setting a motion vector of digital video to be displayed on a display device, comprising:
calculating a correlation between two motion vectors of a plurality of motion vectors of four adjacent macroblocks at least one of the motion vectors pointing in a substantially different direction from the motion vectors of one or more remaining ones of the four adjacent macroblocks;
selecting two motion vectors having a highest correlation among each other;
calculating an average value of the selected two motion vectors;
calculating a final motion vector based on the average value;
reducing a resolution the four adjacent macroblocks into one or more smaller-sized macroblocks;
allocating the final motion vector to the one or more smaller-sized macroblocks; and
storing or transmitting a reduced-resolution version of the digital video for display on a display device based on the final motion vector assigned to the one or more smaller-sized macroblocks, wherein a computer is used to perform said calculating, selecting, reducing, allocating, and storing.

17. The method of claim 16, further comprising: refining the final motion vector to be allocated to the one or more smaller-sized macroblocks.

18. The method of claim 16, wherein the correlation is calculated using the following equation:

$$D(i, j) = \underset{i \neq j}{\mathrm{argmin}}(|mx_i - mx_j| + |my_i - my_j|)$$

where i and j represent horizontal and vertical components of the motion vectors respectively and wherein the arg min function is applied under conditions where i,j=1, 2, 3, 4 where (i≠j), and $mx_i, my_i$ are values of horizontal and vertical components of the motion vectors $mv_i$.

19. The method of claim 18, wherein the lower a result of the equation, the higher the correlation is.

20. The method of claim 16, wherein the final motion vector is calculated using the following equation:

$$mv = \frac{mv}{2}$$

where mv' is the average value of the two motion vectors.

* * * * *